(12) United States Patent
Barsness et al.

(10) Patent No.: US 8,595,742 B2
(45) Date of Patent: *Nov. 26, 2013

(54) EXECUTING A DISTRIBUTED JAVA APPLICATION ON A PLURALITY OF COMPUTE NODES IN ACCORDANCE WITH A JUST-IN-TIME COMPILATION HISTORY

(75) Inventors: Eric L. Barsness, Pine Island, MN (US); David L. Darrington, Rochester, MN (US); Amanda E. Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,606

(22) Filed: Apr. 10, 2012

(65) Prior Publication Data

US 2012/0210330 A1   Aug. 16, 2012

Related U.S. Application Data

(63) Continuation of application No. 12/109,248, filed on Apr. 24, 2008.

(51) Int. Cl.
*G06F 9/46* (2006.01)

(52) U.S. Cl.
USPC ......................................................... 718/104

(58) Field of Classification Search
None
See application file for complete search history.

(56) References Cited

U.S. PATENT DOCUMENTS

| | | |
|---|---|---|
| 5,978,830 A | 11/1999 | Nakaya et al. |
| 6,842,759 B2 | 1/2005 | Haggar et al. |
| 7,568,190 B2 | 7/2009 | Creamer et al. |
| 7,703,089 B2 | 4/2010 | Birenheide |
| 2003/0120776 A1 | 6/2003 | Avvari et al. |
| 2004/0123278 A1* | 6/2004 | Nanja et al. .................. 717/153 |
| 2004/0154016 A1 | 8/2004 | Randall |
| 2005/0005200 A1 | 1/2005 | Matena et al. |
| 2006/0070051 A1* | 3/2006 | Kuck et al. .................. 717/162 |
| 2006/0085785 A1 | 4/2006 | Garrett |
| 2006/0150190 A1 | 7/2006 | Gusler et al. |
| 2006/0195559 A1 | 8/2006 | Winter et al. |

(Continued)

OTHER PUBLICATIONS

Bokhari, "Partitioning Problems in Parallel, Pipelined, and Distributed Computing", IEEE Transactions on Computers, Jan. 1988, pp. 1-10, vol. 37, No. 1, IEEE, USA.

(Continued)

*Primary Examiner* — Jennifer To
*Assistant Examiner* — Eric C Wai
(74) *Attorney, Agent, or Firm* — Biggers & Ohanian, LLP

(57) ABSTRACT

Methods, systems, and products are disclosed for executing a distributed Java application on a plurality of compute nodes. The Java application includes a plurality of jobs distributed among the plurality of compute nodes. The plurality of compute nodes are connected together for data communications through a data communication network. Each of the plurality of compute nodes has installed upon it a Java Virtual Machine ('JVM') capable of supporting at least one job of the Java application. Executing a distributed Java application on a plurality of compute nodes includes: tracking, by an application manager, a just-in-time ('JIT') compilation history for the JVMs installed on the plurality of compute nodes; and configuring, by the application manager, the plurality of jobs for execution on the plurality of compute nodes in dependence upon the JIT compilation history for the JVMs installed on the plurality of compute nodes.

15 Claims, 8 Drawing Sheets

(56) References Cited

U.S. PATENT DOCUMENTS

| | | |
|---|---|---|
| 2006/0271395 A1 | 11/2006 | Harris et al. |
| 2007/0130566 A1 | 6/2007 | Van Rietschote et al. |
| 2008/0034365 A1 | 2/2008 | Dahlestedt |
| 2008/0209434 A1 | 8/2008 | Queck et al. |
| 2008/0288746 A1 | 11/2008 | Inglett et al. |
| 2009/0067334 A1 | 3/2009 | Archer et al. |
| 2009/0119481 A1 | 5/2009 | Vishkin |
| 2009/0172623 A1 | 7/2009 | Cross et al. |
| 2009/0240930 A1 | 9/2009 | Barsness et al. |
| 2009/0271595 A1 | 10/2009 | Barsness et al. |
| 2009/0271596 A1 | 10/2009 | Barsness et al. |
| 2009/0271784 A1 | 10/2009 | Barsness et al. |
| 2009/0271799 A1 | 10/2009 | Barsness et al. |
| 2009/0313636 A1 | 12/2009 | Barsness et al. |

OTHER PUBLICATIONS

Gibbons, "A Historical Application Profiler for Use by Parallel Schedulers", Job Scheduling Strategies for Parallel Processing, Proceedings IPPS '97 Workshop, Geneva Switzerland, Apr. 1997, Lecture Notes in Computer Science, vol. 1291, pp. 58-77, Springer.
Zhu et al., "Lightweight Transparent Java Thread Migration for Distributed JVM", International Conference on Parallel Processing, Oct. 2003, pp. 465-472, IEEE, USA.
Office Action, U.S. Appl. No. 12/053,685, Jul. 20, 2011, pp. 1-10.
Final Office Action, U.S. Appl. No. 12/053,685, Jan. 12, 2012, pp. 1-11.
Office Action, U.S. Appl. No. 12/109,259, Aug. 4, 2011, pp. 1-12.
Notice of Allowance, U.S. Appl. No. 12/109,259, Dec. 13, 2011, pp. 1-9.
Office Action, U.S. Appl. No. 12/109,267, Jul. 28, 2011, pp. 1-13.
Notice of Allowance, U.S. Appl. No. 12/109,267, Jan. 20, 2012, pp. 1-10.
Office Action, U.S. Appl. No. 12/140,023, Mar. 1, 2012, pp. 1-11.
Office Action, U.S. Appl. No. 12/109,238, Jul. 19, 2011, pp. 1-16.
Final Office Action, U.S. Appl. No. 12/109,238, Nov. 17, 2011, pp. 1-13.
Bokhari, "Dual processor scheduling with dynamic reassignment," IEEE Trans. Software Eng., vol. SE-5, pp. 341-349, Jul. 1979.
Advisory Action, U.S. Appl. No. 12/053,685, Mar. 21, 2012.
RCE, U.S. Appl. No. 12/053,685, Apr. 5, 2012.
Office Action, U.S. Appl. No. 12/053,685, Feb. 21, 2013.
Office Action, U.S. Appl. No. 12/140,023, Mar. 1, 2012.
Final Office Action, U.S. Appl. No. 12/140,023, Jun. 22, 2012.
Advisory Action, U.S. Appl. No. 12/140,023, Sep. 19, 2012.
Office Action, U.S. Appl. No. 13/440,065, Aug. 23, 2012.
Final Office Action, U.S. Appl. No. 13/440,065, Feb. 22, 2013.
Office Action, U.S. Appl. No. 13/443,606, Sep. 7, 2012.
U.S. Appl. No. 12/053,685, filed Mar. 24, 2008, Eric L. Barsness.
U.S. Appl. No. 12/109,259, filed Apr. 28, 2008, Eric Barness.
U.S. Appl. No. 12/109,267, filed Apr. 24, 2008, Barness et al.
U.S. Appl. No. 12/140,023, filed Jun. 16, 2008, Eric Barness.
U.S. Appl. No. 12/109,248, filed Apr. 24, 2008, Eric Barness.
U.S. Appl. No. 12/109,238, filed Apr. 30, 2008, Eric Barness.
Bokhari, "Partitioning Problems in Parallel, Pipelined, and Distributed Computing", Jan. 1988, IEEE Transactions on Computers, vol. 37, No. 1.
Gibbons, Richard. "A Historical Application Profiler for Use by Parallel Schedulers" IPPS '97 Proceedings of the Job Scheduling Strategies for Parallel Processing. pp. 58-77.
Wenzhang Zhu, Cho-Li Wang and Francis C.M. Lau. "Lightweight Transparent Java Thread Migration for Distributed JVM" International Conference on Parallel Processing, 2003, pp. 465-472.
Office Action, U.S. Appl. No. 12/053,685, Jul. 20, 2011.
Final Office Action, U.S. Appl. No. 12/053,685, Jan. 12, 2012.
Office Action, U.S. Appl. No. 12/109,259, Aug. 4, 2011.
Notice of Allowance, U.S. Appl. No. 12/109,259, Dec. 13, 2011.
Office Action, U.S. Appl. No. 12/109,267, Jul. 28, 2011.
Notice of Allowance, U.S. Appl. No. 12/109,267, Jan. 20, 2012.
Office Action, U.S. Appl. No. 12/140,023, Mar. 12, 2012.
Office Action, U.S. Appl. No. 12/109,248, Oct. 14, 2011.
Office Action, U.S. Appl. No. 12/109,238, Jul. 19, 2011.
Final Office Action, U.S. Appl. No. 12/109,238, Nov. 17, 2011.

* cited by examiner

EXECUTING A DISTRIBUTED JAVA APPLICATION ON A PLURALITY OF COMPUTE NODES IN ACCORDANCE WITH A JUST-IN-TIME COMPILATION HISTORY

CROSS-REFERENCE TO RELATED APPLICATION

This application is a continuation application of and claims priority from U.S. patent application Ser. No. 12/109,248, filed on Apr. 24, 2008.

BACKGROUND OF THE INVENTION

1. Field of the Invention

The field of the invention is data processing, or, more specifically, methods, apparatus, and products for executing a distributed Java application on a plurality of compute nodes.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

The parallel applications that execute on the nodes in the data communications networks may be implemented in a variety of software programming languages, including the various versions and derivatives of Java™ technology promulgated by Sun Microsystems. Java applications generally run in a virtual execution environment called the Java Virtual Machine ('JVM'), rather than running directly on the computer hardware. The Java application is typically compiled into byte-code form, and then compiled in a just-in-time ('JIT') manner, or on-the-fly, by the JVM into JIT code representing hardware commands specific to the hardware platform on which the JVM is installed.

In a parallel computer, the Java application is generally a distributed application that is composed of multiple jobs; each job implemented using one or more Java classes. Because the jobs are typically designed in a modular fashion, each job may be utilized in more than one Java application. The JVMs on the compute nodes of the parallel computer provide an execution environment for the jobs that make up a Java application. As the compute nodes execute the jobs, each compute node performs JIT compilation and optimization of the job supported by that compute node's JVM. Each time the Java application executes on the parallel computer, the compute nodes generally have to recompile and re-optimize the byte code representing the jobs of the Java application. Because a particular job may be executed on a parallel computer hundreds or thousands of times in one or more Java applications, valuable computing resources are often consumed to repeatedly perform JIT compilation and optimization for the same job regardless of whether that job is used repeatedly in the same Java application or different Java applications.

SUMMARY OF THE INVENTION

Methods, systems, and products are disclosed for executing a distributed Java application on a plurality of compute nodes. The Java application includes a plurality of jobs distributed among the plurality of compute nodes. The plurality of compute nodes are connected together for data communications through a data communication network. Each of the plurality of compute nodes has installed upon it a JVM capable of supporting at least one job of the Java application. Executing a distributed Java application on a plurality of compute nodes includes: tracking, by an application manager, a JIT compilation history for the JVMs installed on the plurality of compute nodes; and configuring, by the application manager, the plurality of jobs for execution on the plurality of compute nodes in dependence upon the JIT compilation history for the JVMs installed on the plurality of compute nodes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
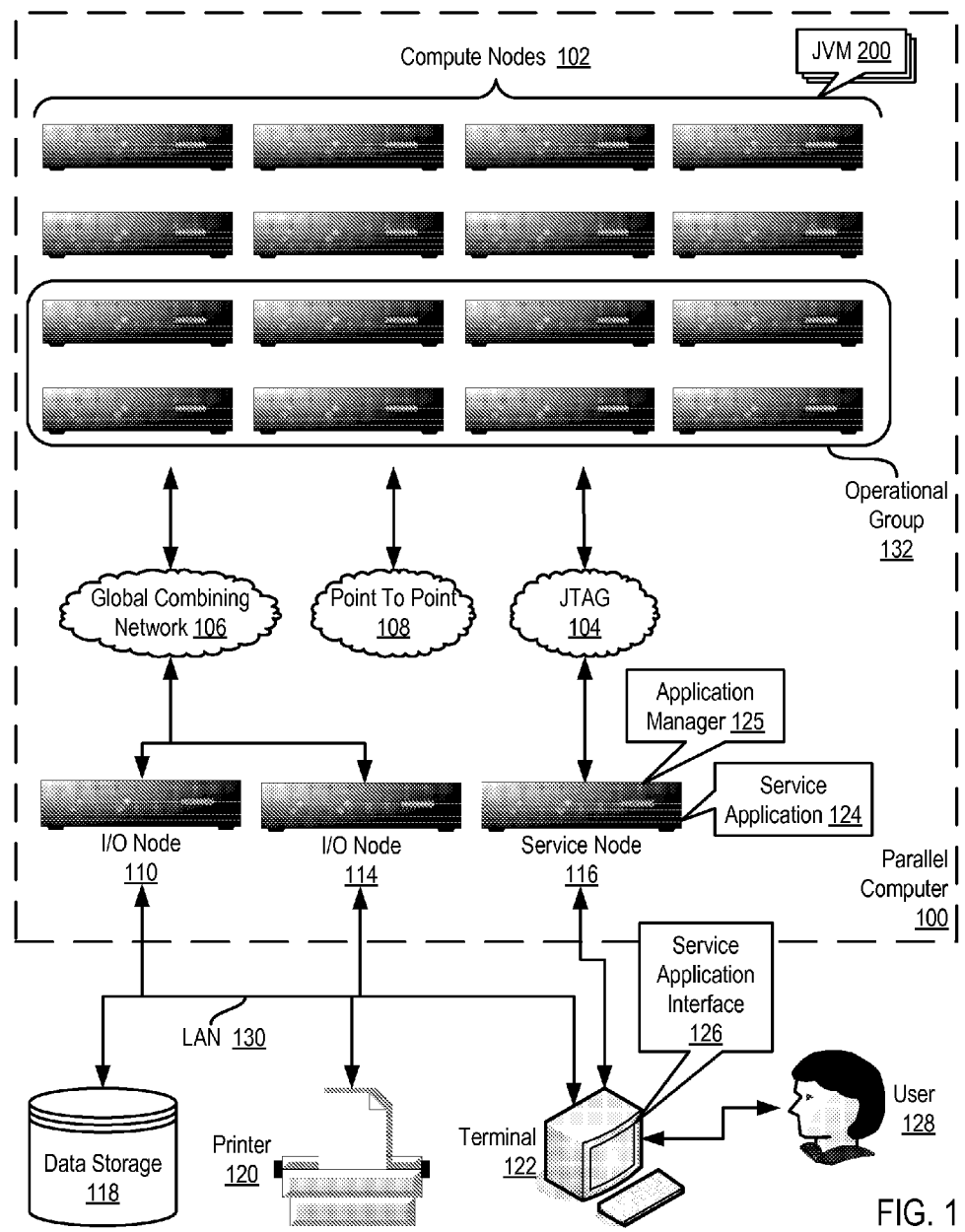
FIG. 1 illustrates an exemplary system for executing a distributed Java application on a plurality of compute nodes according to embodiments of the present invention.

Exemplary methods, apparatus, and computer program products for executing a distributed Java application on a plurality of compute nodes according to embodiments of the present invention are described with reference to the accompanying drawings, beginning with FIG. 1. FIG. 1 illustrates an exemplary system for executing a distributed Java application on a plurality of compute nodes according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102). The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the service node (116) has installed upon it an application manager (125). The application manager (125) of FIG. 1 includes a set of computer program instructions capable of executing a distributed Java application on a plurality of compute nodes according to embodiments of the present invention. The Java application includes a plurality of jobs distributed among the plurality of compute nodes (102) for execution. The application manager (125) operates generally for executing a distributed Java application on a plurality of compute nodes according to embodiments of the present invention by: tracking a JIT compilation history for the JVMs (200) installed on the plurality of compute nodes (102); and configuring the plurality of jobs for execution on the plurality of compute nodes (102) in dependence upon the JIT compilation history for the JVMs (200) installed on the plurality of compute nodes (102). Although FIG. 1 illustrates the application manager (125) installed on a service node, readers will note that such an example is for explanation only and not for limitation. An application manager is a software component that may be installed on any compute nodes or other computer as will occur to those of skill in the art.

The JIT compilation history represents a historical record of the Sitting performed by a particular JVM. The terms 'jit,' 'jitting,' or 'jitted' refer to a JVM's process of translating byte code into native platform machine code executable on the platform's processor and optimizing the machine code for enhanced execution performance. The JIT compilation history typically specifies the portion of the jobs jitted by the JVM and the JIT level at which the jitting on those portions was performed. The job portions identified in the JIT compilation history may be Java classes, methods, call sequences for methods, and so on. Accordingly, the JIT compilation history may include JIT levels for Java constructs processed on the plurality of compute nodes (102) or JIT levels for Java call sequences for particular Java methods processed on the plurality of compute nodes (102).

A JIT level, also referred to as a 'JIT mode,' specifies the type of JIT compiling and optimizations performed on a particular portion of a Java application. The number and type of JIT levels available for a JVM vary from one implementation to another. For one example, Sun Microsystems' JVM has two major JIT levels—client and server. In the client JIT level, minimal compilation and optimization is performed in an effort to reduce the startup time required for the application to begin executing. In the server JIT level, initial startup time is sacrificed, and extensive compilation and optimization is performed to maximize application performance when the application executes. Readers will note that these two JIT level are for example and explanation only and not for limitations. Other JIT levels and other terms besides 'client' and 'server' may be used to identify JIT level as will occur to those of skill in the art.

Each compute node (102) of FIG. 1 has installed upon it a Java Virtual Machine ('JVM') (200) capable of supporting a Java application. Each JVM (200) of FIG. 1 includes a set of computer program instructions capable of executing a distributed Java application on a plurality of compute nodes according to embodiments of the present invention. Each JVM (200) operates generally for executing a distributed Java application on a plurality of compute nodes according to embodiments of the present invention by: recording the JIT compilation history for the jobs supported by that JVM and providing the recorded JIT compilation history to the application manager (125).

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although executing a distributed Java application on a plurality of compute nodes according to embodiments of the present invention is described above in terms of executing a distributed Java application on a parallel computer, readers will note that such an embodiment is for explanation only and not for limitation. In fact, executing a distributed Java application on a plurality of compute nodes according to embodiments of the present invention may be implemented using a variety of computer systems composed of a plurality of nodes network-connected together, including for example a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of executing a distributed Java application on a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of executing a distributed Java application on a plurality of compute nodes according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing a distributed Java application on a plurality of compute nodes according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of executing a distributed Java application on a plurality of compute nodes according to embodiments of the present invention.

Figure 2:
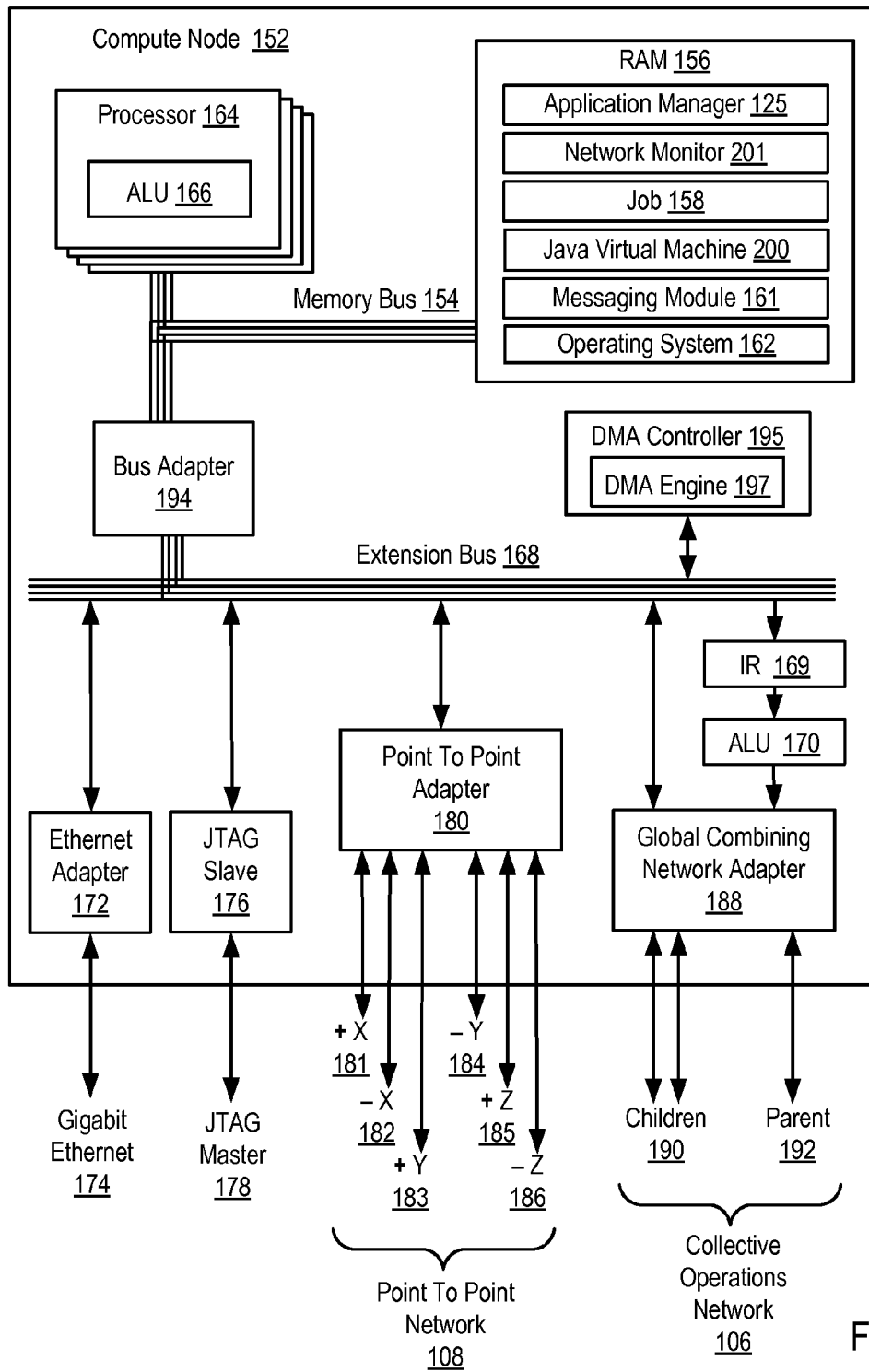
FIG. 2 sets forth a block diagram of an exemplary compute node useful in a parallel computer capable of executing a distributed Java application on a plurality of compute nodes according to embodiments of the present invention.

The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is a job (158) of a Java application distributed across the nodes of the parallel computer. The job (158) is a module of computer program instructions, typically represented in byte code, that carries out parallel, user-level data processing using one or more Java classes.

Also stored in RAM (156) is an application manager (125). The application manager (125) of FIG. 2 includes a set of computer program instructions capable of executing a distributed Java application on a plurality of compute nodes according to embodiments of the present invention. The application manager (125) operates generally for executing a distributed Java application on a plurality of compute nodes according to embodiments of the present invention by: tracking a JIT compilation history for the JVMs installed on the plurality of compute nodes in the parallel computer and configuring the plurality of jobs for execution on the plurality of compute nodes in dependence upon the JIT compilation history for the JVMs installed on the plurality of compute nodes.

Also stored in RAM (156) is a network monitor (201) that monitors the utilization of each of the nodes and the data communication networks connecting the nodes together. The network monitors on the compute nodes communicate with one another to keep all of the nodes and any service nodes informed about the state of the individual nodes and the networks. In addition, the network monitor (201) may be used to facilitate the exchange of JIT compilation histories between the JVMs installed on the compute nodes and the application manager (125). To facilitate such communications each network monitor may register with the application manager (125) and expose and interface to the JVM through which the JVM can update the application manager (125) with the JVM's JIT compilation history. In such a manner, the network monitor (201) may serve a 'local client' for the application manager (125) on each of the nodes.

Also stored in RAM (156) is a JVM (200). The JVM (200) of FIG. 2 is a set of computer software programs and data structures which implements a virtual execution environment for a specific hardware platform. The JVM (200) of FIG. 2 accepts the Java application (158) for execution in a computer intermediate language, commonly referred to as Java byte code, which is a hardware-independent compiled form of the Java application (158). In such a manner, the JVM (200) of FIG. 2 serves to abstract the compiled version of the Java application (158) from the hardware of node (152) because the JVM (200) handles the hardware specific implementation details of executing the application (158) during runtime. Abstracting the hardware details of a platform from the compiled form of a Java application allows the application to be compiled once into byte code, yet run on a variety of hardware platforms.

The JVM (200) of FIG. 2 is improved for executing a distributed Java application on a plurality of compute nodes according to embodiments of the present invention. The JVM (200) of FIG. 2 operates generally for executing a distributed Java application on a plurality of compute nodes according to embodiments of the present invention by: recording the JIT compilation history for the jobs supported by that JVM (200) and providing the recorded JIT compilation history to the application manager (125).

Also stored RAM (156) is a messaging module (161), a library of computer program instructions that carry out parallel communications among compute nodes, including point to point operations as well as collective operations. The Java application (158) effects data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for executing a distributed Java application on a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing a distributed Java application on a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access (DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
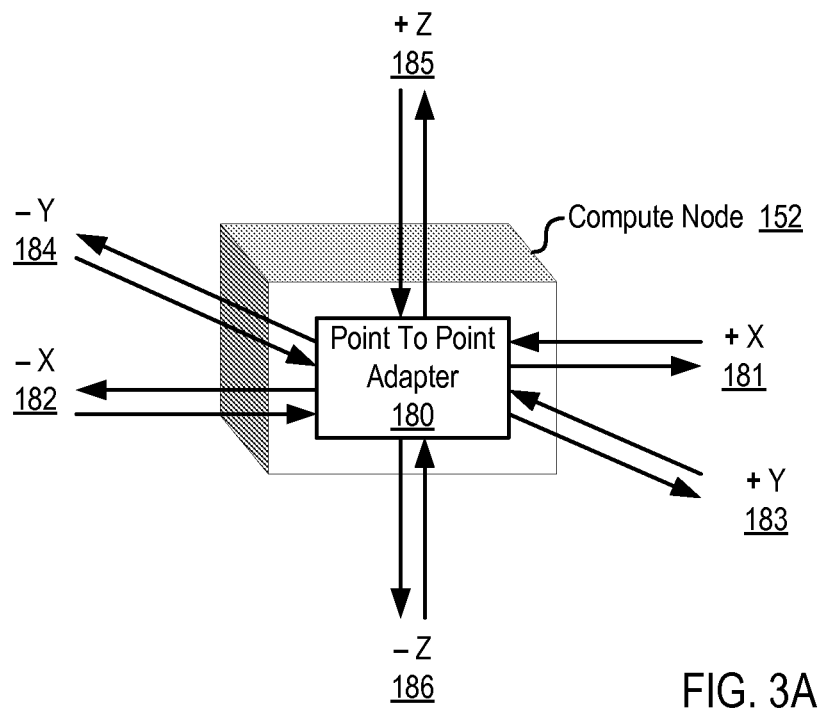
FIG. 3A illustrates an exemplary Point To Point Adapter useful in systems capable of executing a distributed Java application on a plurality of compute nodes according to embodiments of the present invention.

For further explanation, FIG. 3A illustrates an exemplary Point To Point Adapter (180) useful in systems capable of executing a distributed Java application on a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
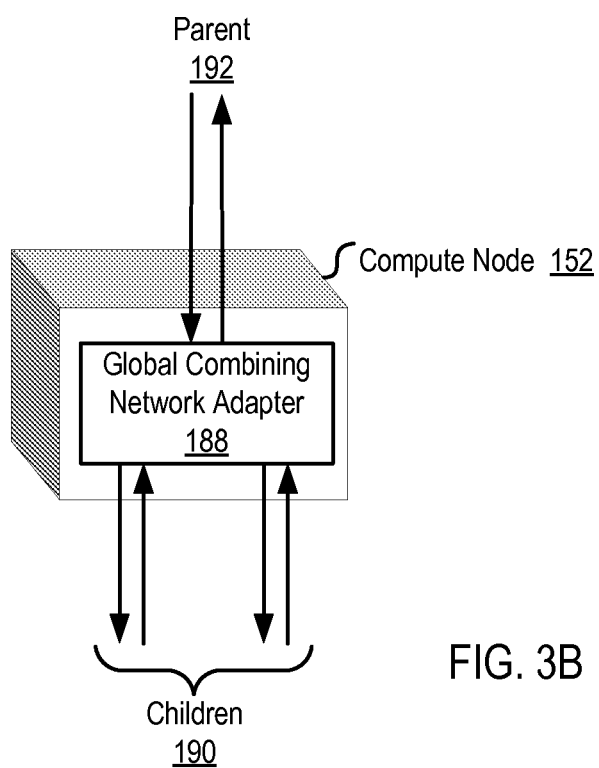
FIG. 3B illustrates an exemplary Global Combining Network Adapter useful in systems capable of executing a distributed Java application on a plurality of compute nodes according to embodiments of the present invention.

For further explanation, FIG. 3B illustrates an exemplary Global Combining Network Adapter (188) useful in systems capable of executing a distributed Java application on a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
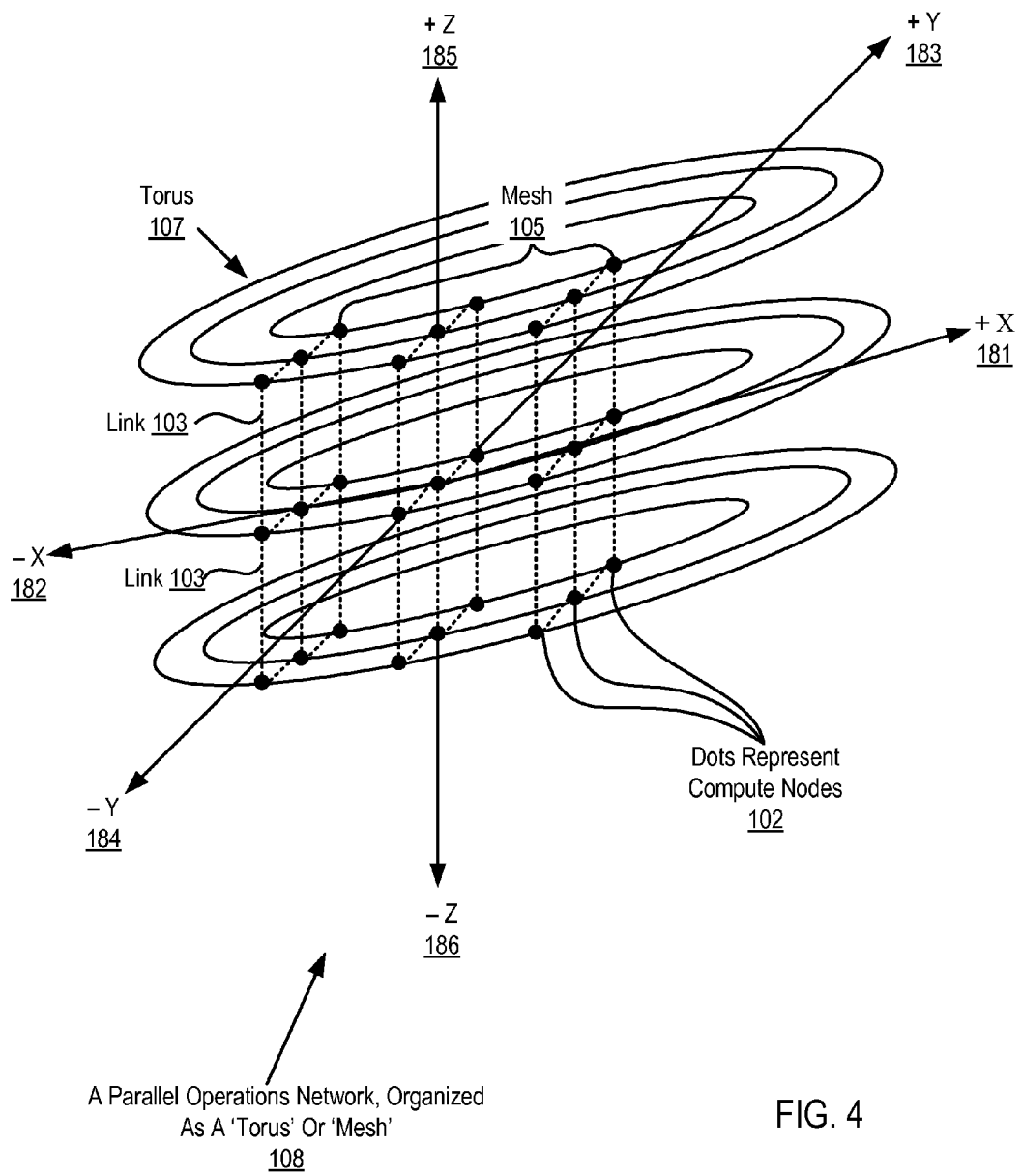
FIG. 4 sets forth a line drawing illustrating an exemplary data communications network optimized for point to point operations useful in systems capable of executing a distributed Java application on a plurality of compute nodes in accordance with embodiments of the present invention.

For further explanation, FIG. 4 sets forth a line drawing illustrating an exemplary data communications network (108) optimized for point to point operations useful in systems capable of executing a distributed Java application on a plurality of compute nodes in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in executing a distributed Java application on a plurality of compute nodes in accordance with embodiments of the present invention may contain only a few compute nodes or may contain thousands of compute nodes.

Figure 5:
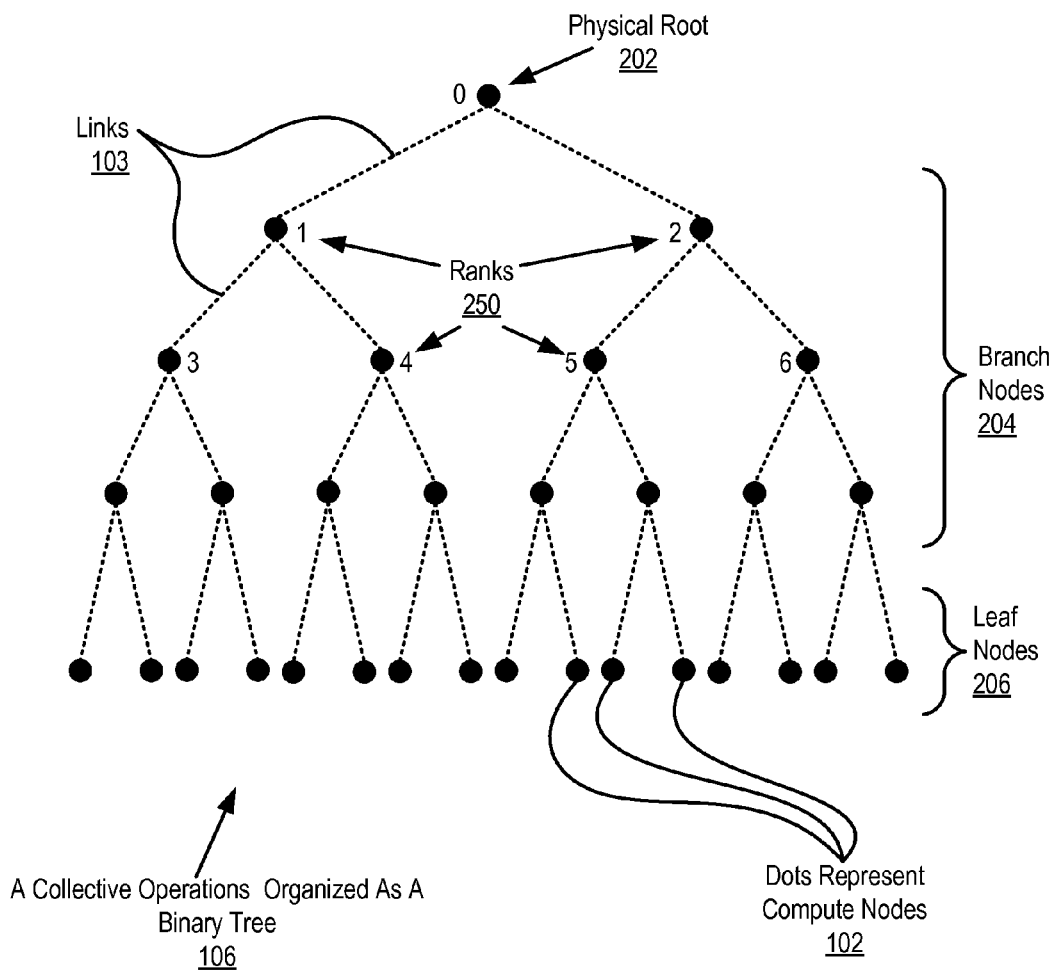
FIG. 5 sets forth a line drawing illustrating an exemplary data communications network optimized for collective operations useful in systems capable of executing a distributed Java application on a plurality of compute nodes in accordance with embodiments of the present invention.

For further explanation, FIG. 5 sets forth a line drawing illustrating an exemplary data communications network (106) optimized for collective operations useful in systems capable of executing a distributed Java application on a plurality of compute nodes in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for executing a distributed Java application on a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
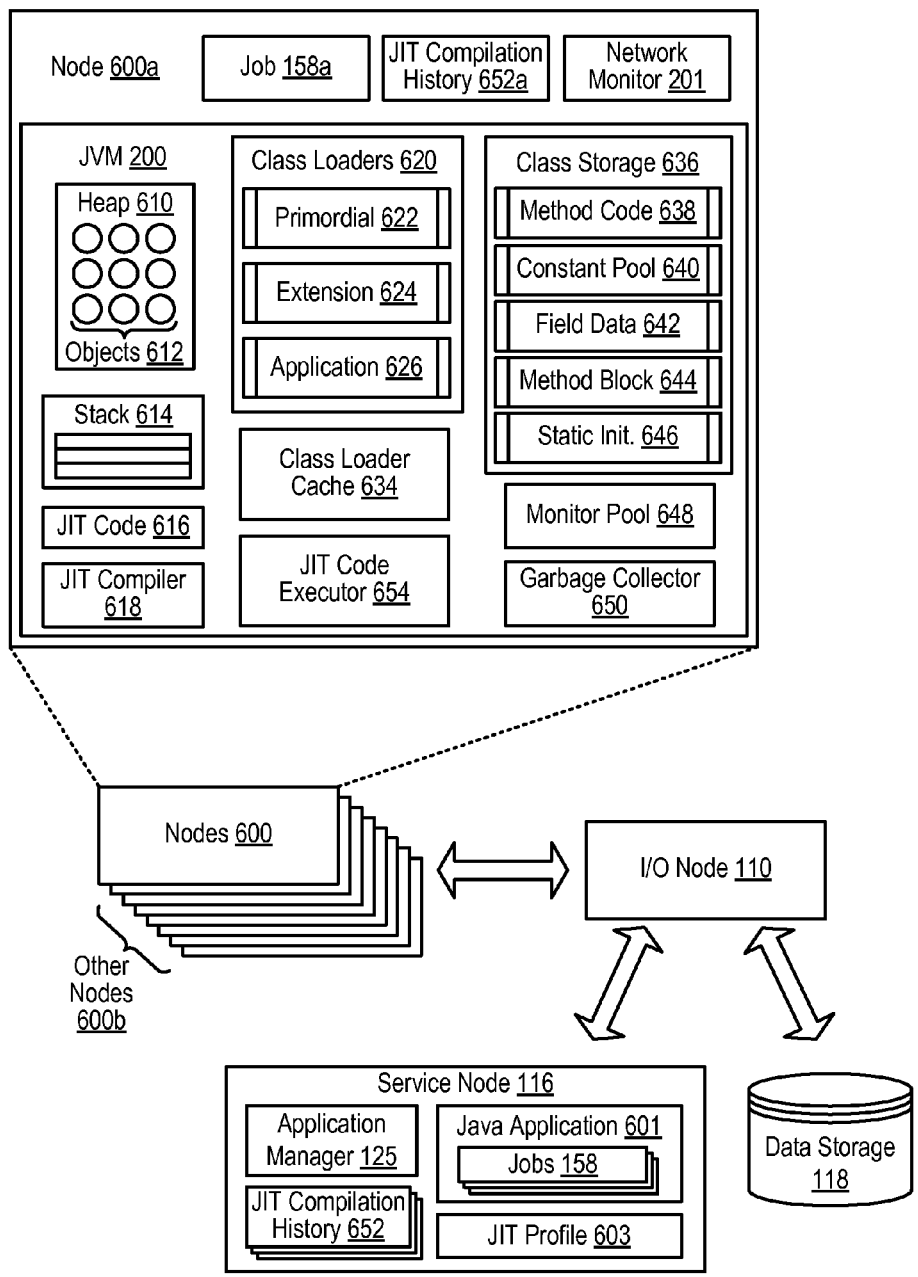
FIG. 6 sets forth a block diagram illustrating an exemplary system useful in executing a distributed Java application on a plurality of compute nodes according to embodiments of the present invention.

For further explanation, FIG. 6 sets forth a block diagram illustrating an exemplary system useful in executing a distributed Java application (601) on a plurality of compute nodes (600a) according to embodiments of the present invention. The Java application (601) of FIG. 6 includes a plurality of jobs (158) distributed among the plurality of compute nodes (600). Each compute node (600) has installed upon it a JVM (200) capable of supporting at least one job (158) of the Java application (601).

The nodes (600) of FIG. 6 are connected together for data communications using a data communication network. In addition, the nodes (600) are connected to an I/O node (110) that provides I/O services between the nodes (600) and a set of I/O devices such as, for example, the service node (116) and the data storage (118). The service node (116) of FIG. 6 provides services common to nodes (600), administering the configuration of nodes (600), loading programs such as Java application (601) and JVM (200) onto the nodes (600), starting program execution on the nodes (600), retrieving results of program operations on the nodes (600), and so on. The data storage (118) of FIG. 6 may store the files that contain the Java classes that compose the Java application (601).

The service node (116) has installed upon it an application manager (125). The application manager (125) includes a set of computer program instructions capable of executing a distributed Java application on a plurality of compute nodes according to embodiments of the present invention. The application manager (125) operates generally for executing a distributed Java application on a plurality of compute nodes according to embodiments of the present invention by: tracking a JIT compilation history (652) for the JVMs (200) installed on the plurality of compute nodes (600) and configuring the plurality of jobs (158) for execution on the plurality of compute nodes (600) in dependence upon the JIT compilation history (652) for the JVMs (200) installed on the plurality of compute nodes (600). In such a manner, the application manager (125) may configure a job (158) of the application (601) for execution on a compute node (600) that has already jitted that particular job at a desired JIT level specified by a JIT profile (603) for the application (601). The node (600) may have already jitted that particular job because the Java application (601) has already been executed on the nodes (600) or that particular job may have been part of another Java application that has already been executed on the nodes (600).

In the example of FIG. 6, the JIT profile (603) of FIG. 6 is a data structure used by the application manager (125) that associates JIT levels with various jobs (158) of the application (601). The JIT profile (603) may be formatted as a text file, a table, a structured document, or any other format as will occur to those of skill in the art. In addition to using the JIT profile (603) to configure jobs (158) on the nodes (600), the application manager (125) may also be used to assign JIT levels to the various jobs (158) of application (601) in a JIT profile (603). The application manager (125) may assign JIT levels to the various jobs (158) of application (601) based on user-specified JIT levels for the various jobs (158) of the application (601) or based on a historic execution performance for the various jobs (158) of the application (601).

The level of granularity at which the application manager (125) assigns JIT levels to a job (158) may vary from one embodiment to another. The application manager (125) may assign a single JIT level to an entire job (158), or the application manager (125) may assign multiple JIT level to a single job (158) such that different portions of the job (158) have different JIT levels. When a JIT level is assigned to a portion of a job (158), the portion may be a generic Java construct, a specific implementation of a Java construct, a call sequence for a particular Java method, and so on. A generic Java construct is a Java specific programming structure such as, for example, a class, a packet, a method, a Java Archive, and so on. A specific implementation of a Java construct is an actual instance of a generic type of Java construct. For example, foo( ) is an example of a specific implementation of a Java method. A call sequence for a particular Java method is the set of instructions in the execution path for a particular Java method from the method's beginning to the method's end. That is, call sequence for a particular Java method includes all of the computer program instructions in that particular method and any instructions of the methods invoked by that particular method.

Using these different exemplary job portions, the application manager (125) of FIG. 6 may assign a different JIT level to any one of these generic types of Java constructs, specific implementations of Java constructs, or call sequences for a particular Java method. For further explanation, consider that a job (158) includes a Java Archive ('JAR') file that, in turn, includes a variety of Java classes. Consider that one of these Java classes is called Too class,' and foo_class includes a method called 'foo_method,' which in turn calls a method named 'foo2_method.' Further consider that the JIT levels available to a particular JVM are 'low,' medium,' 'high,' and 'ultra high.' In such an example, the application manager (125) may assign a JIT level of low to the entire exemplary Java Archive file, a JIT level of medium to foo class, a JIT level of high to foo_method, and a JIT level of ultra high to foo2_method. In such a manner, different portions of the exemplary job are assigned different JIT levels.

In the example of FIG. 6, the application manager (125) configures job (158a) on compute node (600a) for execution based on the JIT compilation history (652a) for the JVM (200) on node (600a). To execute the job (158a), the JVM (200) of FIG. 6 includes a JIT compiler (618) and JIT code executor (654). The JIT compiler (618) compiles the byte code representation of job (158a) into machine code to be run directly on the native platform and optimizes the machine code for enhanced performance. The JIT compiler (618) is typically invoked when the job (158a) is started up or when some other usage criterion is met to improve run-time performance by avoiding the need for this code to be interpreted later. The output from the JIT compiler (618) is JIT code (616), which is in turn provided into the JIT code executor (654) for execution on the platform's processor.

The JIT compiler (618) operates by spawning a compilation thread that receives the byte-code version of the job (158a), translates and optimizes the byte code into native code, and feeds the native code to an execution thread for the JIT code executor (654). After processing various portions of the job (158a), the JIT compiler (618) examines the portions of the job (158a) executed by the JIT code executor (654). The JIT compiler (618) may update the JIT compilation history (652a) for the JVM (200) based on how the JIT code executor (654) executed the job (158a). For example, if portions of the job (158a) are consistently being skipped during execution, the JIT compiler (618) may record in the JIT compilation history (652a) that those portions are often skipped during execution. Similarly, if portions of the job (158a) are being executed repeatedly, the JIT compiler (618) may record in the JIT compilation history (652a) for the JVM (200) that those portions are repeatedly executed. In such a manner, the JIT compiler (618) of FIG. 6 operates generally for executing a distributed Java application on a plurality of compute nodes according to embodiments of the present invention by recording the JIT compilation history (652a) for the job (158a) supported by the JVM (200) and providing the recorded JIT compilation history (652a) to the application manager (125). The JVM (200) may communicate with the application manager (125) through the network monitor (201). The application manager (125) may then in turn utilize the JIT compilation history (652) received from each of the JVMs supporting the jobs (158) to configure the jobs (158) in the future on the nodes (600) that have already jitted the jobs (158) at desired JIT levels.

The job (158a) of the application (601) often represents any number of Java classes. As the JVM (200) executes the job (158a), the JVM identifies a Java class utilized for the job (158a), loads the Java classes for the job (158a) into memory, and prepares each class instance for execution. The JVM (200) therefore includes a hierarchy of class loaders (620) that operate to load the classes specified by the job (158a). The hierarchy of class loaders (620) includes a primordial class loader (622), an extension class loader (624), and an application class loader (626).

The primordial class loader (622) of FIG. 6 loads the core Java libraries, such as 'core.jar,''server.jar,' and so on, in the '<JAVA_HOME>/lib' directory. The primordial class loader (622), which is part of the core JVM, is written in native code specific to the hardware platform on which the JVM is installed. The extension class loader (624) of FIG. 6 loads the code in the extensions directories and is typically implemented by the 'sun.misc.Launcher$ExtClassLoader' class. The application class loader (626) of FIG. 6 loads the class specified by 'java.class.path,' which maps to the system 'CLASSPATH' variable. The application class loader (626) is typically implemented by the 'sun.misc.Launcher$AppClassLoader' class.

For each class included or specified by the job (158a), the JVM (200) effectively traverses up the class loader hierarchy to determine whether any class loader has previously loaded the class. The order of traversal is as follows: first to the default application class loader (626), then to the extension class loader (624), and finally to the primordial class loader (622). If the response from all of the class loaders is negative, then the JVM (200) traverses down the hierarchy, with the primordial class loader first attempting to locate the class by searching the locations specified in its class path definition. If the primordial class loader (622) is unsuccessful, then the then the extension class loader (624) may make a similar attempt to load the class. If the extension class loader (624) is unsuccessful, then the application class loader (626) attempts to load the class. Finally, if the application class loader (626) is unsuccessful, then the JVM (200) triggers an error condition.

The JVM (200) of FIG. 6 also includes a heap (610), which is shared between all threads, and is used for storage of objects (612). Each object (612) represents an already loaded class. That is, each object (612) is in effect an instantiation of a class, which defines the object. Because a job may utilize more than one object of the same type, a single class may be instantiated multiple times to create the objects specified by the job (158a). Readers will note that the class loaders (620) are objects that are also stored on heap (610), but for the sake of clarity the class loaders (620) are shown separately in FIG. 6.

In the example of FIG. 6, the JVM (200) also includes a class storage area (636), which is used for storing information relating to the classes stored in the heap (610). The class storage area (636) includes a method code region (638) for storing byte code for implementing class method calls, and a constant pool (640) for storing strings and other constants associated with a class. The class storage area (636) also includes a field data region (642) for sharing static variables, which are shared between all instances of a class, and a static initialization area (646) for storing static initialization methods and other specialized methods separate from the method code region (638). The class storage area also includes a method block area (644), which is used to stored information relating to the code, such as invokers, and a pointer to the code, which may for example be in method code area (638), in JIT code area (616) described above, or loaded as native code such as, for example, a dynamic link library ('DLL') written in C or C++.

A class stored as an object (612) in the heap (610) contains a reference to its associated data, such as method byte code, in class storage area (636). Each object (612) contains a reference to the class loader (620), which loaded the class into the heap (610), plus other fields such as a flag to indicate whether or not they have been initialized.

In the example of FIG. 6, the JVM (200) also includes a stack area (614), which is used for storing the stacks associated with the execution of different threads on the JVM (200). Readers will note that because the system libraries and indeed parts of the JVM (200) itself are written in Java, which frequently utilize multi-threading, the JVM (200) may be supporting multiple threads even if the job (158a) contains only a single thread.

Also included within JVM (200) of FIG. 6 is a class loader cache (634) and garbage collector (650). The former is typically implemented as a table that allows a class loader to trace those classes which it initially loaded into the JVM (200). The class loader cache (634) therefore allows each class loader (620) to determine whether it has already loaded a particular class when the JVM (200) initially traverses the class loader hierarchy as described above. Readers will note that it is part of the overall security policy of the JVM (200) that classes will typically have different levels of permission within the system based on the identity of the class loader by which they were originally loaded.

The garbage collector (650) is used to delete objects (612) from heap (610) when they are no longer required. Thus in the Java programming language, applications do not need to specifically request or release memory, rather this is controlled by the JVM (200) itself. Therefore, when the job (158a) specifies the creation of an object (612), the JVM (200) secures the requisite memory resource. Then, when the job (158a) finishes using object (612), the JVM (200) can delete the object (612) to free up this memory resource. This process of deleting an object is known as 'garbage collection,' and is generally performed by briefly interrupting all threads on the stack (614), and scanning the heap (610) for objects (612) which are no longer referenced, and therefore can be deleted. The details of garbage collection vary from one JVM (200) implementation to another, but typically garbage collection is scheduled when the heap (610) is nearly exhausted and so there is a need to free up space for new objects (612).

In the example of FIG. 6, the JVM (200) also includes a monitor pool (648). The monitor pool (648) is used to store a set of locks or 'monitors' that are used to control contention to an object resulting from concurrent attempts to access the object by different threads when exclusive access to the object is required.

Although the JVM (200) in FIG. 6 is shown on and described above with regard to the node (600a), readers will note that each of the other nodes (600b) also has installed upon it a JVM configured in a similar manner. That is, each of the other nodes (600b) also has installed upon it a JVM capable of executing a distributed Java application on a plurality of compute nodes according to embodiments of the present invention.

Figure 7:
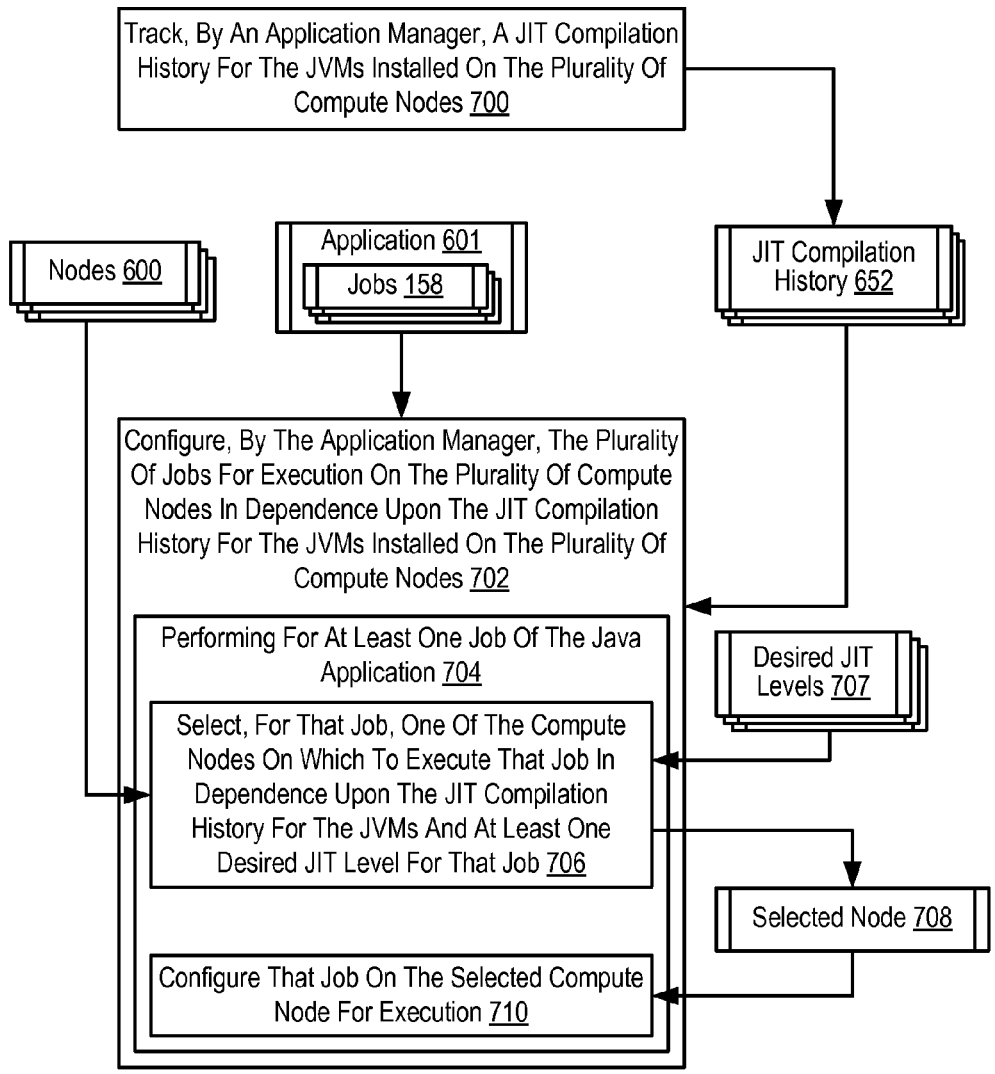
FIG. 7 sets forth a flow chart illustrating an exemplary method for executing a distributed Java application on a plurality of compute nodes according to embodiments of the present invention.

For further explanation, FIG. 7 sets forth a flow chart illustrating an exemplary method for executing a distributed Java application (601) on a plurality of compute nodes (600) according to embodiments of the present invention. The Java application (601) includes a plurality of jobs (158) distributed among the plurality of compute nodes (600). The plurality of compute nodes (600) connected together for data communications through a data communication network. Each of the plurality of compute nodes (600) has installed upon it a JVM capable of supporting at least one job (158) of the Java application (601).

The method of FIG. 7 includes tracking (700), by an application manager, a JIT compilation history (652) for the JVMs installed on the plurality of compute nodes. The application manager may track (700) a JIT compilation history (652) for the JVMs installed on the plurality of compute nodes according to the method of FIG. 7 by receiving the JIT compilation history (652) from each of the JVMs installed on the compute nodes (600). The application manager may receive the JIT compilation history (652) as each of the JVMs transmit its JIT compilation history (652) periodically to the application manager. In some other embodiments, however, the application manager may periodically poll each of the JVMs for the JIT compilation history (652). The application manager and the JVMs may communicate directly with each other or through some intermediary communications facilitator such as, for example, a network monitor.

The JIT compilation history (652) of FIG. 7 represents a historical record of the jitting performed by JVMs installed on the plurality of nodes (600). A JIT compilation history (652) for a JVM typically specifies the portion of the jobs jitted by the JVM and the JIT level at which the jitting on those portions was performed. Because the job portions identified in the JIT compilation history may be Java constructs or call sequences for particular Java methods, the JIT compilation history may specify JIT levels for Java constructs or JIT levels for Java call sequences for particular Java methods. For example, consider the following pseudo code representing an exemplary job executing on one of the nodes:

```
01:     ...
02:     public class FooClass {
03:         static void foo2(...) {
04:             ...
05:             return;
06:         }
07:         static void foo(...) {
08:             ...
09:             FooClass.foo2(...);
10:             ...
11:             return;
12:         ...
13:         public static void main (String[ ] args) {
14:             ...
15:             while (test) {
16:                 FooClass.foo(...);
17:             }
18:             ...
19:             SomeOtherClass.someOtherMethod(...);
20:             ...
21:         }
22:     }
23:     ...
```

The pseudo code above references three Java classes 'Foo-Class,' 'main,' and 'SomeOtherClass.' The main class invokes a member method of FooClass called 'foo' within a while loop and a member method of SomeOtherClass called 'someOtherMethod.' In turn, the foo method invokes another member method of the FooClass called 'foo2.' Readers will note that the exemplary Java application represented by the pseudo code above is for explanation only and not for limitation.

Now consider an exemplary JIT compilation history for the JVM supporting the exemplary job above where the JIT levels are low, medium, high, and ultra high for the various portions within the job:

TABLE 1

EXEMPLARY JIT COMPILATION HISTORY

| JOB PORTION IDENTIFIER | JIT LEVEL |
| --- | --- |
| FooClass | Ultra High |
| foo2 | Ultra High |
| foo | Ultra High |
| main | Medium |
| SomeOtherClass | Ultra High |
| someOtherMethod | Ultra High |
| while loop | Ultra High |
| Java Classes | Medium |
| Java Methods | Medium |
| Call Sequence foo | Ultra High |

The exemplary JIT compilation history above indicates the JVM supporting the exemplary job above jitted the Java constructs FooClass, foo2, foo, SomeOtherClass, someOther-Method, and the while loop at a JIT level of ultra high. The exemplary JIT compilation history above also indicates the JVM supporting the exemplary job above jitted the generic Java class and method constructs and the specific Java construct main at a JIT level of medium. In addition, the exemplary JIT compilation history above indicates the JVM supporting the exemplary job above jitted the call sequence for the foo method at a JIT level of ultra high. Readers will note that the exemplary JIT compilation history above is for explanation only and not for limitation.

The method of FIG. 7 also includes configuring (702), by the application manager, the plurality of jobs (158) for execution on the plurality of compute nodes (600) in dependence upon the JIT compilation history (652) for the JVMs installed on the plurality of compute nodes (600). The application manager configures (702) the plurality of jobs (158) for execution on the plurality of compute nodes (600) according to the method of FIG. 7 by performing (704) for at least one job (158) of the Java application (601): selecting (706), for that job, one of the compute nodes (600) on which to execute that job (158) in dependence upon the JIT compilation history (652) for the JVMs and at least one desired JIT level (707) for that job (158); and configuring (710) that job (158) on the selected compute node (708) for execution.

The desired JIT levels (707) of FIG. 7 represent user-specified JIT levels for the various portions of each job (158) of the Java application (601). The desired JIT levels (707) may be specified in a JIT profile for the application (601) that is provided by a system administrator or application developer. For example, consider the following exemplary JIT profile:

TABLE 2

EXEMPLARY JIT PROFILE

| JOB IDENTIFIER | JOB PORTION IDENTIFIER | JIT LEVEL |
|---|---|---|
| 0 | FooClass | Medium |
| 0 | foo2 | Medium |
| 0 | Foo | Medium |
| 0 | Main | Medium |
| 0 | SomeOtherClass | Medium |
| 0 | someOtherMethod | Medium |
| 0 | while loop | Medium |
| 0 | Java Classes | Medium |
| 0 | Java Methods | Medium |
| 0 | Call Sequence foo | Medium |
| 1 | ... | ... |

The exemplary JIT profile above specifies a desired JIT level of 'medium' for each portion of job 0 in the exemplary application. Readers will note that the exemplary JIT profile above is for explanation only and not for limitation.

In the method of FIG. 7, the application manager may select (706) one of the compute nodes (600) on which to execute a particular job (158) by comparing the JIT compilation history (652) received from each of the JVMs with the desired JIT level (707) for the particular job (158) and selecting the node (708) having the JIT compilation history (652) that best matches the desired JIT level (707) for the particular job (158). The application manager may identify the best match as the compute node providing a JIT compilation history (652) having the highest number of job portions that were previously jitted at a JIT level equal to or higher than the desired JIT level (707) for those same job portions. For example, consider that both node 0 and node 1 have previously executed the exemplary job above. Further consider that node 0 provides the application manager with the exemplary JIT compilation history in Table 1 above and that node 1 provides the application manager with the following exemplary JIT compilation history:

TABLE 3

EXEMPLARY JIT COMPILATION HISTORY

| JOB PORTION IDENTIFIER | JIT LEVEL |
|---|---|
| FooClass | Low |
| foo2 | Low |
| foo | Low |
| main | Low |
| SomeOtherClass | Low |
| someOtherMethod | Low |
| while loop | Low |
| Java Classes | Medium |
| Java Methods | Medium |
| Call Sequence foo | Low |

When comparing the desired JIT levels for the job portions in Table 2 with the exemplary JIT compilations history in Tables 1 for node 0 and in Table 3 for node 1, the application manager determines that node 0 provides a JIT compilation history having the highest number of job portions that were previously jitted at a JIT level equal to or higher than the desired JIT levels for those same job portions. Specifically, node 0 provides a JIT compilation history that includes 10 job portions that were jitted at JIT level equal to or higher than the desired JIT levels for those same job portions, while node 1 only provides a JIT compilation history that includes 2 job portions that were jitted at JIT level equal to or higher than the desired JIT levels for those same job portions.

Readers will note that selecting the node (708) having the JIT compilation history (652) that best matches the desired JIT level (707) for the particular job (158) in the manner described above is for explanation only and not for limitation. In some other embodiments, the application manager may select the best match by taking into account the degree by which a node jitted some job portions less than the desired JIT levels in addition to the overall number of job portions jitted at a level equal to or greater than the desired JIT levels. For example, one node may have jitted all the portions of a job at a level slightly below the desired JIT levels while another node may jitted all the portions of a job at a level significantly lower than the desired JIT level except for a single job portion that was jitted at the desired level. For performance purposes in some applications, selecting the node that jitted all the portions of a job at a level slightly below the desired JIT levels may be more advantageous than selecting the node that jitted all the portions of a job at a level significantly lower than the desired JIT level except for a single job portion that was jitted at the desired level. Still further, readers will note that selecting the node (708) having the JIT compilation history (652) that best matches the desired JIT level (707) for the particular job (158) may be carried out in other ways as will occur to those of skill in the art.

After selecting (706) the node (708) on which to execute a particular job, the application manager may configure (710) that job (158) on the selected compute node (708) for execution according to the method of FIG. 7 by instructing a service node to write the particular job into computer memory of the selected node (708) and instructing the service node to in turn instruct the selected node (708) to begin executing the particular job (158) through that node's JVM. Although the configuring above occurs through a service node, readers will note that in some embodiments the application manager may itself provide the job to the selected node (708) and instruct the compute node to begin execution.

As described above, in some embodiments, an application manager tracks a JIT compilation history for the JVMs installed on the compute nodes by receiving the individual JIT compilation history from each of the JVMs on the nodes. In such embodiments, the JVMs installed on the nodes record their individual JIT compilation histories for reporting to the application manager. For further explanation, therefore, consider FIG. 8 that sets forth a flow chart illustrating a further exemplary method for executing a distributed Java application on a plurality of compute nodes according to embodiments of the present invention.

Figure 8:
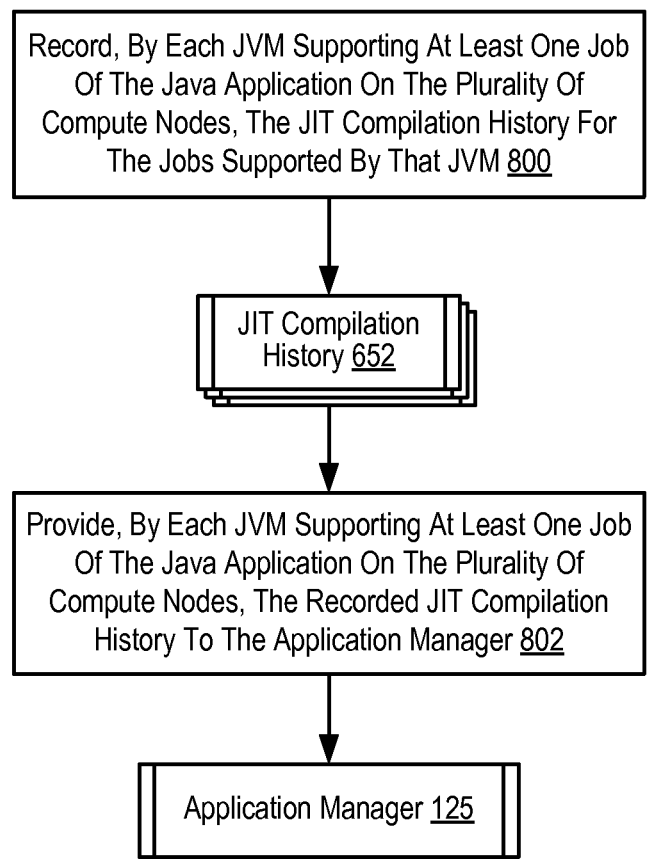
FIG. 8 sets forth a flow chart illustrating a further exemplary method for executing a distributed Java application on a plurality of compute nodes according to embodiments of the present invention.

The method of FIG. 8 includes recording (800), by each JVM supporting at least one job of the Java application on the plurality of compute nodes, the JIT compilation history (652) for the jobs supported by that JVM. Each JVM may record (800) the JIT compilation history (652) for the jobs supported by that JVM according to the method of FIG. 8 by logging in the JVM's JIT compilation history (652) the portion of the job being jitted and the JIT level at which that job portion is being jitting by the JVM. In some embodiments, the JVM may determine the JIT level at which that job portion is jitted based on some user-specified JIT level for that particular job portion that the JVM retrieves from a configuration file for the job. In some other embodiments, the JVM may determine the JIT level at which that job portion is jitted based on current or historical execution performance.

The method of FIG. 8 includes providing (802), by each JVM supporting at least one job of the Java application on the plurality of compute nodes, the recorded JIT compilation history (652) to the application manager (125). Each JVM may provide (802) the recorded JIT compilation history (652)

to the application manager (125) according to the method of FIG. 8 by transmitting the recorded JIT compilation history (652) directly to the application manager (125) across a data communications network. In other embodiments, each JVM may provide (802) the recorded JIT compilation history (652) to the application manager (125) according to the method of FIG. 8 by passing the recorded JIT compilation history (652) to a network monitor installed on the node with the JVM. The network monitor may then pass the recorded JIT compilation history (652) to the application manager (125) across a data communications network. In such a manner, the network monitor serves as a 'local client' for the application manager (125) on the node with the JVM. Upon receiving the JIT compilation histories (652), the application manager (125) may then utilize the JIT compilation histories (652) in subsequent executions of Java applications that include the jobs already jitted on the compute nodes.

Exemplary embodiments of the present invention are described largely in the context of a fully functional computer system for executing a distributed Java application on a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing a distributed software application on a plurality of compute nodes, the software application comprising a plurality of jobs distributed among the plurality of compute nodes, the plurality of compute nodes connected together for data communications through a data communication network, each of the plurality of compute nodes having installed upon it a Virtual Machine ('VM') capable of supporting at least one job of the software application, the method comprising:

tracking, by an application manager, a just-in-time ('JIT') compilation history for the VMs installed on the plurality of compute nodes, wherein the JIT compilation history includes JIT levels for portions of the software application previously processed on the plurality of compute nodes; and configuring, by the application manager, the plurality of jobs for execution on the plurality of compute nodes in dependence upon the JIT compilation history for the VMs installed on the plurality of compute nodes including:

performing for at least one job of the software application:
selecting, for that job, one of the compute nodes on which to execute that job in dependence upon the JIT compilation history for the VMs and at least one desired JIT level for that job; and
configuring that job on the selected compute node for execution.

2. The method of claim 1 wherein the JIT compilation history further comprises JIT levels for software constructs processed on the plurality of compute nodes.

3. The method of claim 1 wherein the JIT compilation history further comprises JIT levels for software call sequences for particular software methods processed on the plurality of compute nodes.

4. The method of claim 1 further comprising:
recording, by each VM supporting at least one job of the software application on the plurality of compute nodes, the JIT compilation history for the jobs supported by that VM; and
providing, by each VM supporting at least one job of the software application on the plurality of compute nodes, the recorded JIT compilation history to the application manager.

5. The method of claim 1 wherein executing a distributed software application on a plurality of compute nodes further comprises executing a distributed software application on a parallel computer, the parallel computer comprising the plurality of compute nodes and a service compute node, the application manager installed upon the service compute node, the plurality of compute nodes connected for data communications through a plurality of data communications networks, at least one data communications network optimized for collective operations, and at least one other data communications network optimized for point to point operations.

6. A computing system for executing a distributed software application, the computing system comprising a plurality of compute nodes, the software application comprising a plurality of jobs distributed among the plurality of compute nodes, the plurality of compute nodes connected together for data communications through a data communication network, each of the plurality of compute nodes having installed upon it a Virtual Machine ('VM') capable of supporting at least one job of the software application, the computing system comprising one or more computer processors and computer memory operatively coupled to the computer processors, the computer memory having disposed within it computer program instructions that when executed by the one or more computer processors cause the computing system to carry out the steps of:

tracking, by an application manager, a just-in-time ('JIT') compilation history for the VMs installed on the plurality of compute nodes, wherein the JIT compilation history includes JIT levels for portions of the software application previously processed on the plurality of compute nodes; and configuring, by the application manager, the plurality of jobs for execution on the plurality of compute nodes in dependence upon the JIT compilation history for the VMs installed on the plurality of compute nodes including:

performing for at least one job of the software application:
selecting, for that job, one of the compute nodes on which to execute that job in dependence upon the JIT compilation history for the VMs and at least one desired JIT level for that job; and configuring that job on the selected compute node for execution.

7. The computing system of claim 6 wherein the JIT compilation history further comprises JIT levels for software constructs processed on the plurality of compute nodes.

8. The computing system of claim 6 wherein the JIT compilation history further comprises JIT levels for software call sequences for particular software methods processed on the plurality of compute nodes.

9. The computing system of claim 6 wherein the computer memory has disposed within it computer program instructions that when executed by the one or more computer processors cause the computing system to carry out the steps of:
recording, by each VM supporting at least one job of the software application on the plurality of compute nodes, the JIT compilation history for the jobs supported by that VM; and
providing, by each VM supporting at least one job of the software application on the plurality of compute nodes, the recorded JIT compilation history to the application manager.

10. The computing system of claim 6 wherein executing a distributed software application on a plurality of compute nodes further comprises executing a distributed software application on a parallel computer, the parallel computer comprising the plurality of compute nodes and a service compute node, the application manager installed upon the service compute node, the plurality of compute nodes connected for data communications through a plurality of data communications networks, at least one data communications network optimized for collective operations, and at least one other data communications network optimized for point to point operations.

11. A computer program product for executing a distributed software application on a plurality of compute nodes, the software application comprising a plurality of jobs distributed among the plurality of compute nodes, the plurality of compute nodes connected together for data communications through a data communication network, each of the plurality of compute nodes having installed upon it a Virtual Machine ('VM') capable of supporting at least one job of the software application, the computer program product disposed upon a computer readable medium, the computer readable medium not comprising a signal, the computer program product comprising computer program instructions that when executed by a computer cause the computer to carry out the steps of:
tracking, by an application manager, a just-in-time ('JIT') compilation history for the VMs installed on the plurality of compute nodes, wherein the JIT compilation history includes JIT levels for portions of the software application previously processed on the plurality of compute nodes; and
configuring, by the application manager, the plurality of jobs for execution on the plurality of compute nodes in dependence upon the JIT compilation history for the VMs installed on the plurality of compute nodes including:
performing for at least one job of the software application:
selecting, for that job, one of the compute nodes on which to execute that job in dependence upon the JIT compilation history for the VMs and at least one desired JIT level for that job; and
configuring that job on the selected compute node for execution.

12. The computer program product of claim 11 wherein the JIT compilation history further comprises JIT levels for software constructs processed on the plurality of compute nodes.

13. The computer program product of claim 11 wherein the JIT compilation history further comprises JIT levels for software call sequences for particular software methods processed on the plurality of compute nodes.

14. The computer program product of claim 11 further comprising computer program instructions that when executed by the computer cause the computer to carry out the steps of:
recording, by each VM supporting at least one job of the software application on the plurality of compute nodes, the JIT compilation history for the jobs supported by that VM; and
providing, by each VM supporting at least one job of the software application on the plurality of compute nodes, the recorded JIT compilation history to the application manager.

15. The computer program product of claim 11 wherein executing a distributed software application on a plurality of compute nodes further comprises executing a distributed software application on a parallel computer, the parallel computer comprising the plurality of compute nodes and a service compute node, the application manager installed upon the service compute node, the plurality of compute nodes connected for data communications through a plurality of data communications networks, at least one data communications network optimized for collective operations, and at least one other data communications network optimized for point to point operations.

* * * * *